United States Patent Office.

WILLIAM MILLER WALTERS AND FREDERICK RICHARD STONE, OF LIVERPOOL, ENGLAND.

MANUFACTURE OF PRESERVATIVE COATINGS FOR IRON OR STEEL.

SPECIFICATION forming part of Letters Patent No. 543,636, dated July 30, 1895.

Application filed September 6, 1894. Serial No. 522,302. (No specimens.) Patented in England October 27, 1893, No. 20,253.

*To all whom it may concern:*

Be it known that we, WILLIAM MILLER WALTERS and FREDERICK RICHARD STONE, subjects of the Queen of Great Britain, residing at Liverpool, in the county of Lancaster, England, have invented a new and useful Improvement in the Manufacture of Preservative Coatings for Iron or Steel, (for which we have applied for Letters Patent in England, No. 20,253, dated October 27, 1893;) and we do hereby declare that the following is a full, clear, and exact description of the invention, which will enable others skilled in the art to which it appertains to make and use the same.

The object is to provide an improved coating or liquid for cleansing and preserving iron and steel from oxidation, and also for acting as a primary coating to be afterward painted over or varnished.

We have ascertained by experiment that tannic acid has a strong affinity for iron and steel, and that it so acts on iron or steel oxide or rust as to render the same innocuous, but that by itself the resulting coating is not sufficiently permanent.

Now our invention consists essentially in providing means whereby the said facts may be utilized for obtaining a sufficiently permanent and adhering coating for iron and steel.

In carrying our invention into practice, under one modification we dissolve tannic acid and a gum—such as gum acacia, commonly known as "gum arabic," dextrine, or the like—separately in water and mix the acid and gum solution together in the required proportions. The gum is preferably reduced to a fine powder before solution, and the water in which the said gum is dissolved is advantageously heated by steam or otherwise. Under a second modification of the process the required quantity of tannic acid is added to the mucilage or gum solution when partially cooled.

We find in practice that in order that the tannic acid may act on the iron and steel so as to render any rust innocuous, and also to prevent oxidation, it is inadvisable to have less than half a pound of the acid to a gallon of the fluid, and it does not appear to be of advantage to have more than three pounds to the gallon. In practice we find one pound answers well. To render the coating more adherent and permanent, gum weighing about one-half of the weight of the acid to the gallon of coating should be used. Glycerine, or a mixture of glycerine and water, may be used instead of water.

The coating or liquid mixture is applied to the iron and steel by a brush, cloth, or the like and forms thereon a durable and efficient coating, mainly insoluble in water, and also a good groundwork on which to paint or varnish.

Having fully described our invention, what we claim, and desire to secure by Letters Patent, is—

1. A coating for iron and steel consisting of a solution of tannic acid and gum, substantially in the proportions named.

2. The method of preparing a preservative liquid consisting in separately dissolving tannic acid and gum, and then mixing these solutions, substantially as described.

WILLIAM MILLER WALTERS.
FREDERICK RICHARD STONE.

Witnesses:
A. W. BIRKETT,
ARNOLD H. SEWARDS.